R. B. SWIFT.
MOLDING WHEELS, &c.

No. 176,899.  Patented May 2, 1876.

Witnesses
Albert W. Bright
F. V. McCleary

Inventor:
Rufus B. Swift.
By Leggett & Leggett

R. B. SWIFT.
MOLDING WHEELS, &c.

No. 176,899.

2 Sheets—Sheet 2.

Patented May 2, 1876.

Witnesses
Albert M. Bright
F. O. McClanya

Inventor
Rufus B. Swift
By Leggett & Leggett

UNITED STATES PATENT OFFICE.

RUFUS B. SWIFT, OF CLEVELAND, OHIO, ASSIGNOR OF ONE-HALF HIS RIGHT TO JOSEPH J. BROOKS, OF SAME PLACE.

IMPROVEMENT IN MOLDING WHEELS, &c.

Specification forming part of Letters Patent No. 176,899, dated May 2, 1876; application filed February 5, 1876.

*To all whom it may concern:*

Be it known that I, RUFUS B. SWIFT, of Cleveland, in the county of Cuyahoga and State of Ohio, have invented certain new and useful Improvements in Molding Cog and other Wheels, &c.; and I do hereby declare the following to be a full, clear, and exact description of the invention, such as will enable others skilled in the art to which it pertains to make and use it, reference being had to the accompanying drawings, which form part of this specification.

My invention relates to an improvement in the manufacture of wheels, followers, piston-heads, and articles generally having a circular contour.

The drawings represent my invention as adapted to the manufacture of spur, bevel, or other description of gear-wheels.

Figure 1:
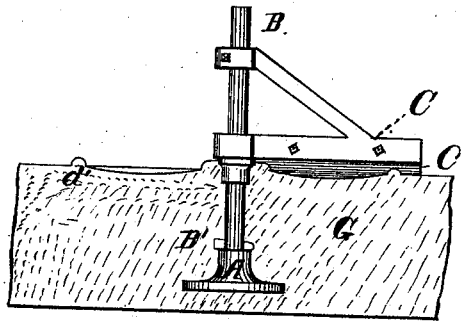
Figure 2:
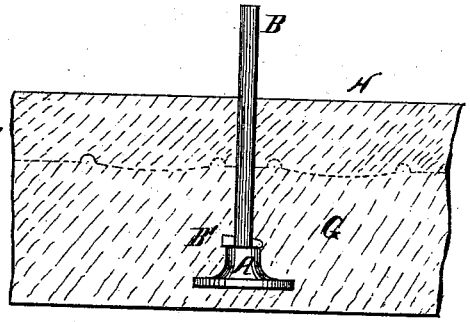
Figure 3:
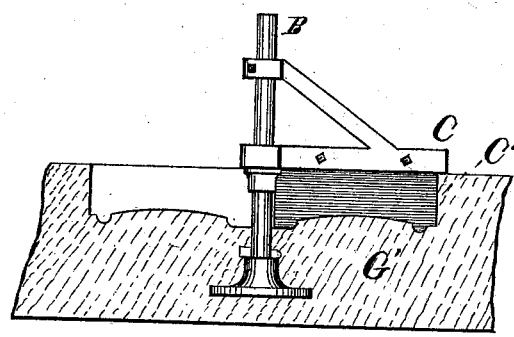
Figure 4:
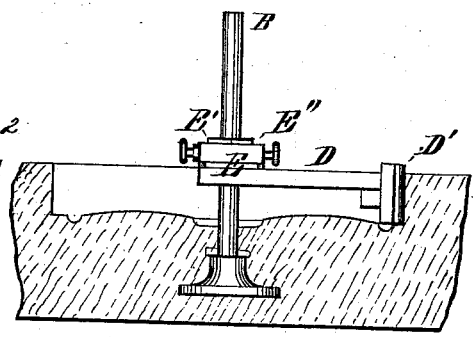
Figure 5:
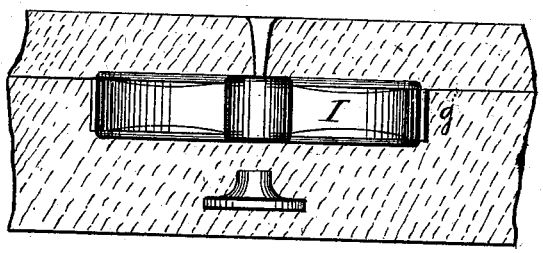
Figure 6:
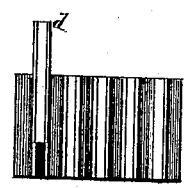
Figure 7:
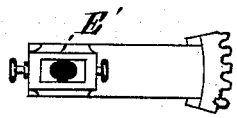
Figure 9:
Figure 8:
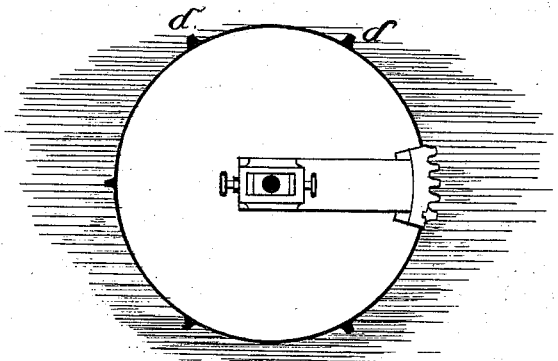
Figure 10:
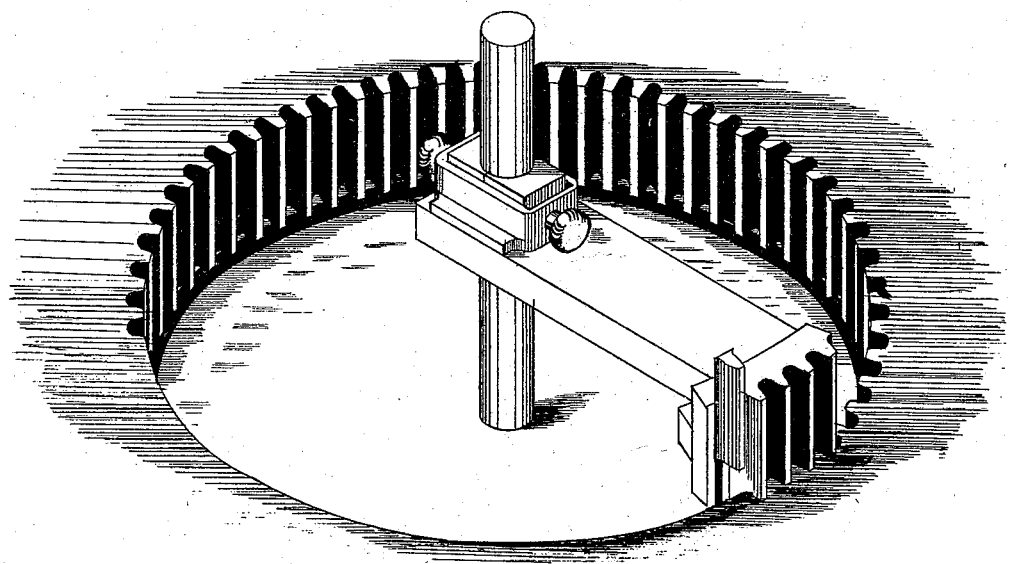

Figure 1 represents a view in longitudinal section, showing my device as operating in forming a surface for the shaping or patterning of the cope to form the upper face or surface of a wheel, the same constituting the first step of my process, to be hereinafter described. Fig. 2 is a view in longitudinal section, showing the second step of my said process, where the cope has been placed in position and the sand rammed over the bed, as shown in Fig. 1, the dotted line showing the points of separation when the cope shall be removed. Fig. 3 is a view in longitudinal section, showing the third step of my said process, wherein the cope has been removed, the well dug, and its bottom shaped to form the opposite surface or face of the wheel. Fig. 4 is a view in longitudinal section, showing the fourth step of my said process, wherein my device for forming the teeth of the cog-wheel is in operation. Fig. 5 is a view in longitudinal section, illustrating the next step of my said process, wherein the machinery has been removed, the cores properly placed, the cope put in position, and all the parts ready for casting. Fig. 6 represents the face of my segment for molding the teeth of a gear-wheel, showing the movable tooth. Fig. 7 is a plan view of said segment, of its arm, and of my device for lengthening or shortening said arm, to diminish or increase the diameter of the wheel. Fig. 8 is a plan view of the well shown in Fig. 3, illustrating the manner of marking off and testing the arrangement of teeth on the rim of the wheel. Fig. 9 is a segmental piece to protect the groove for the formation of the web or shroud of a gear-wheel during the operation of molding the teeth. Fig. 10 is an isometric view, showing my device as in the operation of forming and molding the teeth of a gear-wheel.

My invention consists of the following steps, parts, and combinations, as hereinafter specified and claimed, wherein—

A is a base or foundation, of any suitable material, which is bedded in the floor of the molding-room to a suitable depth, to be entirely out of the way in the operation of molding and casting. B is a post or spindle set into and supported by the base A. B' is a longitudinal slot made near the lower end of the spindle B. C is a circular sweep, having a removable blade, $C^1$, of definite form or contour, to fashion or mold the sand for shaping the upper face of the wheel. $C^2$ is a substitute blade to be placed upon the sweep C, for molding the sand to shape the lower face of the wheel. D is an arm swinging upon the spindle B, for carrying the segment D'. d is a movable tooth placed at or near one end of the segment D'. E is a journal or boxing fixed upon the segment-arm D, whereby said arm is lengthened or shortened at pleasure, and clamped at any desired length or at any desired height upon the post B. $E^1$ is that portion of the journal E which, by the turning of its set-screw, will lengthen or shorten the segment-arm D. $E^2$ is that portion of the journal E which, by the turning of its set-screw, serves to clamp the segment-arm D in any desired position upon the post B. G represents the molding-sand as formed by the blade $C^1$. G' shows the molding-sand as formed by the blade $C^2$. g represents the prepared surface or face of the molding-floor left outside of and around the well, for the purpose of providing an accurate bearing and support for the cope H. d' represents the test-marks made upon the molding-sand for determining and proving the accurate position of the cogs or teeth upon the rim of the wheel. I is a segmental piece to rest in and protect the groove of the mold that forms the web or shroud of a gear-wheel during the operation of molding the teeth.

Operation: The base A is first bedded in the molding-floor to a sufficient depth to rest entirely below the bottom of the well, so as to be undisturbed and out of the way during the process of casting. This base A, being once properly located, may remain permanent, and employed for any desired number of subsequent castings at that place. Its removal, however, when desired, is a simple operation, requiring only to be dug up and transplanted. This base gives support to the post or spindle B, upon which operate various portions of my device, as will hereinafter appear.

The base A and post B having been located, as above shown, the subsequent steps and operations are as follows: The sweep C, armed with the blade $C^1$, is first placed in position on the post B. The molding-floor beneath is now properly prepared and shaped by sweeping the blade $C^1$ around until the desired contour is obtained. This contour may be of any desired fashion or pattern, according to the shape of the blade $C^1$. Fig. 1 of the drawings shows this step of the operation as accomplished with the mechanism just described. When the molding-sand has been properly shaped by the blade $C^1$ it is covered with parting-sand, and the sweep C and blade $C^1$ removed. The cope H is now made by ramming the sand over and upon the surface prepared by the blade $C^1$, and when this is done it is lifted away. The surface prepared by the blade $C^1$ is now destroyed in digging the well, care being taken, however, to leave a bearing-surface, $g$, all around the well, to afford a suitable resting-place for the cope H. By this means is also insured a proper apposition of parts. The well being dug to the proper depth, its bottom is shaped and fashioned by the blade $C^2$, whose operation is similar to that of the blade $C^1$. Fig. 3 of the drawings shows this step of my process.

The next operation is the molding of the cogs or teeth upon the rim of the wheel; and for the purpose of illustrating my invention I have here described the operation of making what is technically called a "webbed" or "shrouded" gear-wheel, although it is manifest that my invention is not at all limited to the construction of any particular article.

The method of molding the cogs or teeth constitutes an important feature of my invention. To perform this step of my operation the segment-arm D is placed upon the post B, as shown in Figs. 4 and 10 of the drawings, and the movable tooth $d$ adjusted in such a manner that its bottom will touch the floor of the well at the same time as its fellow teeth. The segment D' is preferably made to be some definite fraction of a circle, though this rule is not essential.

By means of the adjusting device $E^1$ the segment-arm may be lengthened or shortened at pleasure, and by means of the device E it may be clamped or fixed at any desired length or at any desired point upon its spindle B, as the segment to the bottom of the well and tracing $d'$ is made in the molding-sand around the tooth $d$, also around the second tooth from that end of the segment D' opposite to the movable tooth $d$. The tracing around this said second tooth is only made at the first tracing. The segment D' is now moved forward one length, and the movable tooth $d$ made to register over the tracing-mark of the aforementioned second tooth. In this position the tracing is taken around the movable tooth, the segment again moved one length forward, and so on until the circle is completed. If at the last placing of the segment the tooth $d$ should register accurately over the first tracing, it is apparent that the teeth will be regular upon the rim of the wheel. If, however, the last placing of the segment D' shows an imperfect registration of the tooth $d$ with the first tracing, then the segment-arm D must be lengthened or shortened, as may be necessary, until the registration above named is perfect—in other words, until the cogs or the teeth will all come evenly and regularly upon the rim of the wheel. When this adjustment has been accurately determined the clamping device E is put in operation and the rim fixed at its proper length upon its post B. This being accomplished, the process of molding the teeth next follows, and this is done by sliding down the movable tooth $d$ so that its bottom end projects lower than those of its stationary teeth. The segmental piece shown in Fig. 9 of the drawings is then placed so as to protect that portion of the mold which forms the web or shroud, and the segmental arm is let down upon the floor of the well. A stop or barrier, which may be a board or piece of sheet metal, or anything of the like, is placed against one end of the segment D', to prevent the escape or spreading of the sand during the process of ramming it. When the sand has been properly molded against the segment, the segment is drawn by first loosening the screw of the device $E^1$, which will retract the segment slightly, and enable it to be slid upward by its arm D upon the post B. The segment and its arm are then moved forward one length and placed in proper position upon the floor of the well, next adjacent to that portion where the teeth have been already molded, the board to support the sand is again placed in position, and another section of cogs or teeth molded, as above described. This operation is repeated until the entire circle is completed. The post B is now removed by simply drawing out from the post A, having first loosened it by tapping upon the wedge passing through the slot B' near the bottom of the post B. The proper cores are now adjusted which are to form the rims and the shaft or center hole. The cope H is now placed over the well, being directed by suitable guides to insure its exact and proper position, and, as before mentioned, the finished surface $g$ gives a perfect and equal bearing between the cope and well. The cope having been duly secured in position, all things are now ready for a casting, which may be done in any suitable manner.

I desire it to be clearly understood that the description herein given is but one of many applications to which my invention is capable of being put. It is adapted to the manufacture of wheels of every description; also, to the making of almost any article having a circular contour; and in fitting it to these various uses my invention is susceptible of many modifications without any departure from its spirit and intent.

What I claim is—

1. The combination, with a spindle-bearing, A, and spindle B, of a circular sweep for carrying blades or formers, the said spindle-bearing adapted to be embedded in the sand below the circular sweep, substantially as and for the purpose described.

2. The combination, with the spindle-bearing A and spindle B, of the sweep and movable blades $C^1 C^2$, the said spindle-bearing arranged below the lower plane of the circular sweep, substantially as and for the purpose described.

3. The removable post or spindle B, in combination with the slot and wedge B', and base A, substantially as and for the purpose shown.

4. In combination with the central post or spindle B, the segment-arm D and segment D' of a cog-wheel pattern, provided with the movable tooth $d$, substantially as and for the purpose shown.

5. The process, substantially as herein described, in the molding of wheels and articles of a similar character, of molding or forming the cope by first shaping the sand upon the molding-floor by a bladed circular sweep, and molding said cope over the floor thus shaped, substantially as shown.

In testimony whereof I have signed my name to this specification in the presence of two subscribing witnesses.

RUFUS B. SWIFT.

Witnesses:
LEVERETT L. LEGGETT,
JOSEPH J. BROOKS.